United States Patent
Joy et al.

(10) Patent No.: US 8,301,937 B2
(45) Date of Patent: Oct. 30, 2012

(54) HEARTBEAT SYSTEM

(75) Inventors: Ian M. Joy, Fife (GB); Gordon D. Patton, Dundee (GB)

(73) Assignee: NCR Corporation, Duluth, GA (US)

( * ) Notice: Subject to any disclaimer, the term of this patent is extended or adjusted under 35 U.S.C. 154(b) by 212 days.

(21) Appl. No.: 12/787,623

(22) Filed: May 26, 2010

(65) Prior Publication Data

US 2011/0296251 A1    Dec. 1, 2011

(51) Int. Cl.
*G06F 11/00*    (2006.01)

(52) U.S. Cl. ............ 714/38.12; 714/38.1; 714/47.1; 714/55; 717/127

(58) Field of Classification Search .......... 714/38.1, 714/38.12, 47.1, 55, 38.14; 717/127
See application file for complete search history.

(56) References Cited

U.S. PATENT DOCUMENTS

| | | | | |
|---|---|---|---|---|
| 6,058,393 A * | 5/2000 | Meier et al. | ........... | 717/124 |
| 6,425,093 B1 * | 7/2002 | Singh et al. | ........... | 714/38.14 |
| 6,651,185 B1 * | 11/2003 | Sauvage | ........... | 714/15 |
| 6,792,460 B2 * | 9/2004 | Oulu et al. | ........... | 709/224 |
| 6,892,331 B2 * | 5/2005 | Da Palma et al. | ........... | 714/55 |
| 7,096,388 B2 * | 8/2006 | Singh et al. | ........... | 714/38.12 |
| 7,096,459 B2 * | 8/2006 | Keller et al. | ........... | 717/124 |
| 7,269,824 B2 * | 9/2007 | Noy et al. | ........... | 717/127 |
| 7,421,478 B1 * | 9/2008 | Muchow | ........... | 709/209 |
| 7,529,990 B2 * | 5/2009 | Haggerty | ........... | 714/724 |
| 7,752,501 B2 * | 7/2010 | Bak | ........... | 714/38.14 |
| 7,886,295 B2 * | 2/2011 | Burger et al. | ........... | 718/100 |
| 2003/0028680 A1 | 2/2003 | Jin | | |
| 2003/0037289 A1 * | 2/2003 | Singh et al. | ........... | 714/38 |
| 2005/0235136 A1 | 10/2005 | Barsotti | | |
| 2006/0143595 A1 * | 6/2006 | Dostert et al. | ........... | 717/127 |
| 2006/0190948 A1 * | 8/2006 | Burger et al. | ........... | 719/314 |
| 2006/0200705 A1 * | 9/2006 | Burger et al. | ........... | 714/47 |
| 2007/0067754 A1 * | 3/2007 | Chen et al. | ........... | 717/127 |
| 2007/0220375 A1 * | 9/2007 | Baz | ........... | 714/55 |
| 2008/0127103 A1 * | 5/2008 | Bak | ........... | 717/126 |
| 2008/0134046 A1 | 6/2008 | Gray | | |
| 2008/0228873 A1 * | 9/2008 | Baskey et al. | ........... | 709/203 |
| 2009/0037573 A1 * | 2/2009 | Qiu et al. | ........... | 709/224 |
| 2009/0328027 A1 * | 12/2009 | Tsuchiya et al. | ........... | 717/171 |

FOREIGN PATENT DOCUMENTS

EP    0609990 A2    8/1994

OTHER PUBLICATIONS

International Search Report for European Patent Application No. EP11165100.6, mailed Oct. 7, 2011.

* cited by examiner

*Primary Examiner* — Joshua P Lottich
(74) *Attorney, Agent, or Firm* — Michael Chan

(57) ABSTRACT

A method of generating a heartbeat signal for an application comprising one or more objects that may enter a halt state is described. The method comprises: sending a status request to a defined interface on each object; and monitoring responses to the status requests to ascertain if each object is operating normally or in a halt state. The method further comprises: generating an application valid signal in the event that each object is operating normally; transmitting the application valid signal, if generated, to a monitoring component independent of the application; and generating at the monitoring component a heartbeat valid signal in response to receipt of the application valid signal.

20 Claims, 3 Drawing Sheets

HEARTBEAT SYSTEM

FIELD OF INVENTION

The present invention relates to a heartbeat system.

BACKGROUND OF INVENTION

During execution, a software object may contain one or more active threads of execution and may access one or more other software objects. A thread of execution within an object may enter a permanently halted state (a hung state) for a number of reasons. These reasons include: a mutually exclusive resource conflict, an external error (such as an event from a device never occurring), and coding logic error (such as an infinite loop).

To enable a system to detect when a thread of execution has entered a halted state, software objects are typically coded with logic that generates a heartbeat at defined time intervals, and conveys this heartbeat to a monitoring object. A heartbeat is a signal that is emitted at regular intervals by a software object to demonstrate to another software object (the monitoring object) that it is still running (that is, it is not halted). If the monitoring object does not receive a heartbeat within the defined time then the monitoring object regards the thread of execution as halted.

This type of heartbeat system has several disadvantages. For example, the monitoring object must be aware of all of the heartbeats that are present in the system, and the defined time interval for each heartbeat, so that it can ascertain if a heartbeat has been missed. As the number of objects generating a heartbeat increases, the management overhead increases for the monitoring object. Furthermore, every object having a thread of execution that may enter a halt state must have its own code to generate a heartbeat, which is an inefficient use of code. This is also an inefficient use of processing time, since every object automatically produces a regular heartbeat.

SUMMARY OF INVENTION

Accordingly, the invention generally provides methods, systems, apparatus, and software for an improved heartbeat system.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of generating a heartbeat signal for an application comprising one or more objects that may enter a halt state, the method comprising:

(a) sending a status request to a defined interface on each object;
(b) monitoring any response to the status requests to ascertain if each object is operating normally or in a halt state;
(c) generating an application valid signal in the event that each object is operating normally;
(d) transmitting the application valid signal, if generated, to a monitoring component independent of the application; and
(e) generating at the monitoring component a heartbeat valid signal in response to receipt of the application valid signal.

The step of sending a status request to a defined interface on an object may be implemented using a component within the application. Alternatively, the step of sending a status request to a defined interface on an object may be implemented using a component external to the application.

The defined interface may be common to all objects within the application, which has the advantage that status requests only have to conform to one interface. Alternatively, the defined interface may be different for different objects within the application.

The step of monitoring any response to the status requests to ascertain if each object is operating normally or in a halt state may include the sub-steps of either (i) receiving a response from each object, or (ii) not receiving a response from every object within a response time. The response from the object may indicate that the object is operating normally (that is, not in a halt state), or in a halt state. The response time may be selected such that a response not being received within the response time indicates that the object is in a halt state.

The method may comprise the further step of (c+1) generating an application invalid signal in the event that at least one object is in a halt state.

The method may comprise the further step of (d+1) transmitting the application invalid signal, if generated, to the monitoring component.

The method may comprise the further step of (f) generating at the monitoring component a heartbeat invalid signal in the event that either (i) the application valid signal is not received within a reporting interval, or (ii) an application invalid signal is received.

The method may be repeated after each heartbeat interval has elapsed.

Steps (a) and (b) may be repeated every polling interval.

The step of transmitting the application valid signal to a monitoring component independent of the application may be repeated once in every reporting interval if the polling interval is longer than the reporting interval.

The step of generating at the monitoring component a heartbeat valid signal may be implemented once in every heartbeat interval if the reporting interval is longer than the heartbeat interval.

Each object may have a different polling interval. Alternatively, the same polling interval may be applied to each object, or to each object within the same application suite.

According to a second aspect there is provided a heartbeat system comprising:

(i) an application comprising:
  (a) at least one object that may enter a halt state, each object including a defined interface identical for all objects and for receiving status requests; and
  (b) a querying component arranged to ascertain if each object is operating normally or in a halt state by sending a status request to the defined interface of each object, and being further arranged to transmit an application valid signal when all objects are operating normally;
(ii) a monitoring component in communication with the querying component and operable to receive the application valid signal therefrom, the monitoring component being arranged to generate (a) a heartbeat valid signal in the event that the application valid signal is received within a reporting interval, or (b) a heartbeat invalid signal in the event that the application valid signal is not received within the reporting interval.

The querying component may be further arranged to transmit an application invalid signal when one or more objects are in a halt state.

The monitoring component may be arranged to generate (b) a heartbeat invalid signal in the event that the application valid signal is not received within the reporting interval, or the application invalid signal is received.

The heartbeat system may comprise a plurality of applications and the monitoring component, each of the plurality of applications including (a) at least one object that may enter a halt state, each object including a defined interface identical for all objects within that application (or across the plurality of applications) and for receiving status requests; and (b) a querying component. Thus, only one monitoring component is required to monitor multiple applications, each of the multiple applications may comprise multiple objects, each of these objects having the same defined interface for receiving and responding to status requests.

The querying component may create a communication object arranged to communicate with the monitoring component. The communication object may register with the monitoring component and may provide parameters to the monitoring object. These parameters may include (i) a reporting interval and (ii) a polling interval. The reporting interval is the defined time within which the application valid signal should be communicated from the communication object to the monitoring component. The polling interval is the time period within which (or event trigger in response to which) the querying component must send a status request to the defined interface of each object to ascertain if each object is operating normally or in a halt state. There may be multiple polling intervals because different objects may have different polling intervals. Alternatively, all objects may have the same polling interval.

The monitoring component may further comprise a process list object. The process list object may include a list of all processes that are registered with the monitoring component.

Where the querying component includes a communication object arranged to communicate with the monitoring component, the querying component may be arranged to register the communication object with the process list object. The querying component may register a process name of the communication object with the process list object.

The monitoring component may be further arranged to update an event log to indicate whether a heartbeat valid signal or a heartbeat invalid signal was generated by the monitoring component.

The components may be defined in the Microsoft (trade mark).NET framework. The components may communicate using inter-process communication (IPC).

As used herein, an "object" refers to a software entity including data and instructions that can be executed.

It should now be appreciated that this aspect has the advantage that instead of having to provide a heartbeat function within each object, each object can be provided with a common interface. Each object responds to a status request via this interface. The objects do not have to generate heartbeats, they merely have to respond to requests when they arrive, thereby saving valuable processing time.

According to a third aspect there is provided a computer program arranged to implement the steps of the first aspect.

The computer program may be tangibly embodied on a record medium, executed on a computer memory, or propagated on a signal carrier.

According to a fourth aspect there is provided a self-service terminal programmed to implement the steps of the first aspect.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

According to a fifth aspect there is provided a method of generating a heartbeat from an application comprising one or more objects that may enter a halt state, the method comprising:

(a) sending a status request to a defined interface on an object to ascertain if that object is operating normally or in a halt state;

(b) receiving a response from the object;

(c) repeating steps (a) and (b) for each object;

(d) generating an application status signal based on the responses to the status requests;

(e) transmitting the application status signal to a monitoring component independent of the application;

(f) generating at the monitoring component a heartbeat valid signal in the event that the application status signal (i) is received within a defined time and (ii) indicates that each object is operating normally;

(g) generating at the monitoring component a heartbeat invalid signal in the event that either (i) the application status signal is not received within the defined time, or (ii) the application status signal indicates that at least one object is in a halt state.

The method may further comprise a method of generating a heartbeat from a plurality of applications, each application comprising one or more objects that may enter a halt state, the method comprising:

repeating steps (a) to (e) for each application; and step (f) may further comprise generating at the monitoring component a heartbeat valid signal in the event that an application status signal from each application (i) is received within a defined time and (ii) indicates that each object is operating normally; and step (g) may further comprise generating at the monitoring component a heartbeat invalid signal in the event that either (i) one or more application status signals is not received within the defined time, or (ii) one or more application status signals indicates that at least one object is in a halt state.

Although step (c) appears to be sequential to steps (a) and (b), the above language does not exclude step (c) being performed simultaneously with steps (a) and (b)), so that the above language specifically includes the possibility that a status request may be sent simultaneously to all objects whose status is to be ascertained.

The step of generating an application status signal based on responses to the status requests may include the sub-step of generating a valid application status signal in the event that no response to the status requests indicates that an object is in a halt state.

The step of generating an application status signal based on responses to the status requests may include the sub-step of generating an invalid application status signal in the event that either (i) one or more responses to the status requests indicates that an object is in a halt state, or (ii) one or more responses to the status requests are not received. Alternatively, an application status signal may not be generated if a valid application status signal cannot be generated.

The step of transmitting the application status signal to a monitoring component independent of the application may be implemented once in every reporting interval.

The step of generating at the monitoring component a heartbeat valid signal may be implemented once in every heartbeat interval provided that the most recently received application status signal (i) was received within a defined time and (ii) indicated that each object was operating normally.

The poll interval may be independent of the heartbeat interval.

According to a sixth aspect there is provided a computer programmed to implement the steps of the first aspect.

Definitions

The following time periods used herein are defined below:

"Polling Interval". This refers to the time period during which the querying component must issue a status request to an object. Each object being queried may have its own polling interval, or a uniform polling interval may be used for all objects in the application, or a global polling interval may be used for all objects across multiple applications (if multiple applications are used).

"Response Time". This refers to the time period within which an object must respond to a status request. Failure of an object to respond within the response time may cause the querying component to regard that object as being in a halt state.

"Reporting Interval". This refers to the time period during which an application valid signal must be transmitted to the monitoring component for the monitoring component to generate a heartbeat valid signal.

"Heartbeat Interval". This refers to the time period during which a heartbeat valid signal must be transmitted to a management system (that is, software external to the application(s) that is responsible for monitoring timely receipt of heartbeat valid signals) for the management system to regard the application (or applications, where multiple applications are executing) as operating normally (that is, not in a halt state).

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
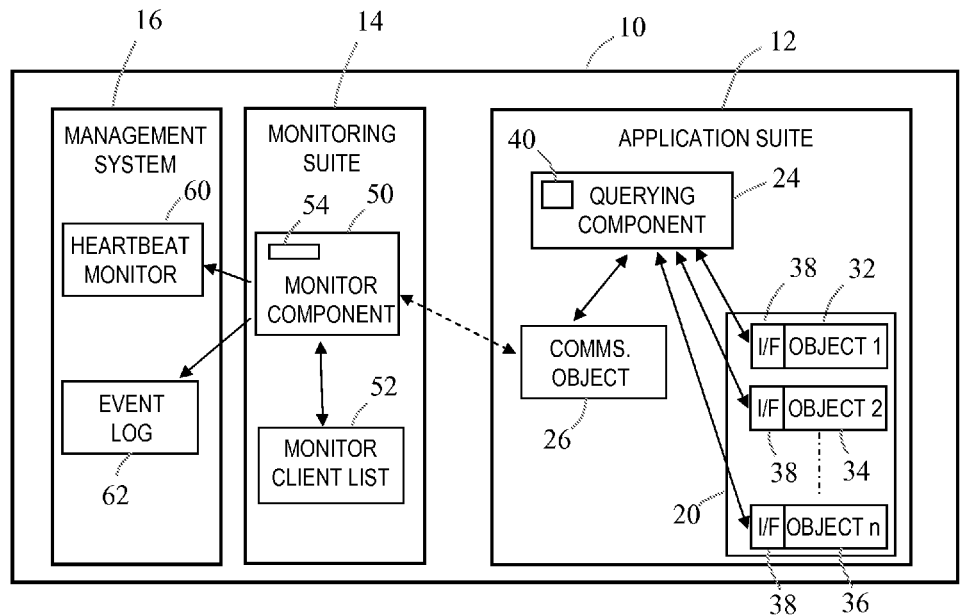
FIG. 1 is a simplified schematic diagram of an SST memory executing software components providing a heartbeat function according to an embodiment of the present invention.

Reference is first made to FIG. 1, which is a simplified, schematic diagram of software components executing in an SST memory 10 according to one embodiment of the present invention. In this embodiment, the SST memory is an ATM memory.

As shown in FIG. 1, the memory 10 executes various software entities, including an application suite 12, a monitoring suite 14, and a management system 16. These software entities are implemented using the Microsoft .NET framework.

The application suite 12 includes transaction control code 20 comprising a plurality of application business and user interface objects used for collecting information relating to a customer, managing components in the ATM, obtaining authorization from a remote transaction authorization host (not shown), and other conventional functions of an ATM.

The application suite 12 also comprises a querying component 24 and a communication object 26 instantiated by the querying component 24.

The transaction control code 20 comprises a large number of objects (labeled "Object 1" to "Object n" in FIG. 1), although only three objects 32,34,36 are illustrated in FIG. 1. Each of these objects 32,34,36 includes an identical, defined interface (referred to herein as the "IActivityMonitor" interface) 38 that supports a single method (the "IsActive" method). It should be appreciated that each of the objects 32,34,36 includes other interfaces to enable the objects 32,34, 36 to perform their required functions, but these other interfaces are conventional and not required to understand this embodiment, so will not be described in detail herein.

This IActivityMonitor interface 38 allows the querying component 24 to send a status request to any object having that interface. If that object is not in a halt state, then it responds to that status request within a predetermined time (referred to herein as the response time) with an indication that the object is operating normally. In this embodiment, the response time is one second, and a response to the status request is provided as a single bit which is active. If the object is in a halt state then it will either not respond within the response time, or will respond with an indication (provided as a single bit which is inactive) that the object is in a halt state.

The communication object 26 is an interprocess communication (IPC) remoteable object, and is responsible for enabling the querying component 24 to communicate with the monitoring suite 14.

The querying component 24 includes a timer routine 40 to ensure that the querying component 24 sends a status request to each object 32,34,36 once every polling interval. In this embodiment, the polling interval is the same for all objects in the application suite 12, and has a value of sixty seconds. The querying component 24 also uses the timer routine 40 to ensure that the querying component 24 transmits an application valid signal once every reporting interval. In this embodiment the reporting interval is ninety seconds.

The monitoring suite 14 comprises a monitoring component 50, and a process list object (referred to herein as a monitor client list object) 52 instantiated by the monitoring component 50. The monitor client list object 52 is also an IPC remotable object, and is responsible for maintaining a list of processes within applications (such as the process corresponding to communication object 26 in the application suite 12) that are being communicated with.

If all of the objects 32,34,36 in the application suite 12 are operating normally (that is, not in a halt state), then the monitoring component 50 receives an application valid signal from communication object 26 once in every reporting interval (ninety seconds in this embodiment). The monitoring component 50 uses this application valid signal to generate a heartbeat valid signal. The monitoring component 50 then transmits the heartbeat valid signal to a heartbeat monitor 60 within the management system 16, and writes a heartbeat valid entry to an event log 62 within the management system 16.

If one or more of the objects 32,34,36 in the application suite 12 are not operating normally (that is, in a halt state), then the monitoring component 50 does not receive an application valid signal from communication object 26. The monitoring component 50 responds to the absence of the application valid signal to generate a heartbeat invalid signal. The monitoring component 50 then transmits the heartbeat invalid signal to the heartbeat monitor 60, and writes a heartbeat invalid entry to the event log 62.

The monitoring component 50 includes a timer routine 54 to ensure that a heartbeat signal (either heartbeat valid or heartbeat invalid) is transmitted to the heartbeat monitor 60 once in every heartbeat interval, which is one hundred and twenty seconds in this embodiment.

Figure 2:
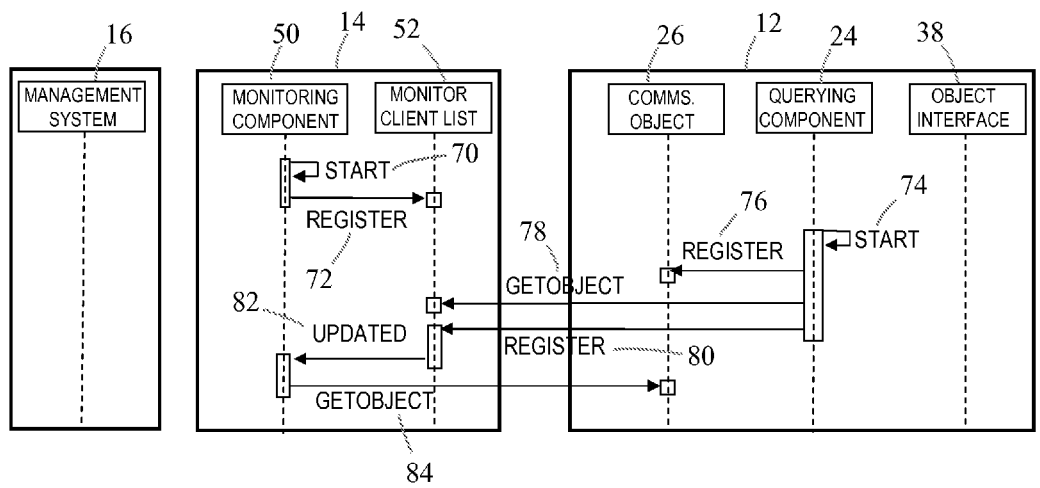
FIG. 2 is a simplified sequence diagram illustrating messages and events associated with the software components of FIG. 1 as they register to provide a heartbeat function.

The operation of the software entities of FIG. 1 will now be described with reference to FIG. 2, which is a simplified sequence diagram illustrating messages and events associated with the application suite 12 and the monitoring suite 14, when the application suite 12 registers to provide a heartbeat function.

Initially, the monitoring component 50 is instantiated (event 70 in FIG. 2) prior to any of the processes or components that it monitors. The monitoring component 50 then creates and registers an instance of the monitor client list object 52 (event 72).

The application suite 12 then starts up and instantiates the querying component 24 (event 74). The querying component 24 then registers an instance of the communication object 26 (event 76).

Using IPC remoting, the querying component 24 then calls the monitor client list object 52 (using the "GetObject" command) to obtain an object reference for the monitor client list object 52 (event 78). The querying component 24 is programmed with a name and port of the monitor client list object 52 so that the querying component 24 knows how to access the monitor client list object 52.

Once the querying component 24 has the object reference for the monitor client list object 52, the querying component 24 can register the process name of the communication object 26 with the monitor client list object 52 (event 80).

Once the communication object 26 has been registered with the monitor client list object 52, the monitor client list object 52 updates the monitoring component 50 to inform the monitoring component 50 about the process name of the communication object 26 (event 82).

The monitoring component 50 uses this process name to obtain an object reference for the communication object 26 (using the "GetObject" command) (event 84) and parameters associated with the application suite 12. These parameters include the reporting interval and the polling interval.

At this point, the application suite 12 and the monitoring suite 14 are fully instantiated and set-up for monitoring the status of the objects 32,34,36 within the application suite 12.

If a new application is added, then this new application would perform similar events (event 74 through event 80) to those described above, and the monitoring suite 14 would perform events 82 and 84, so that the new application would be automatically added as an application to be monitored by the monitoring suite 14.

Figure 3:
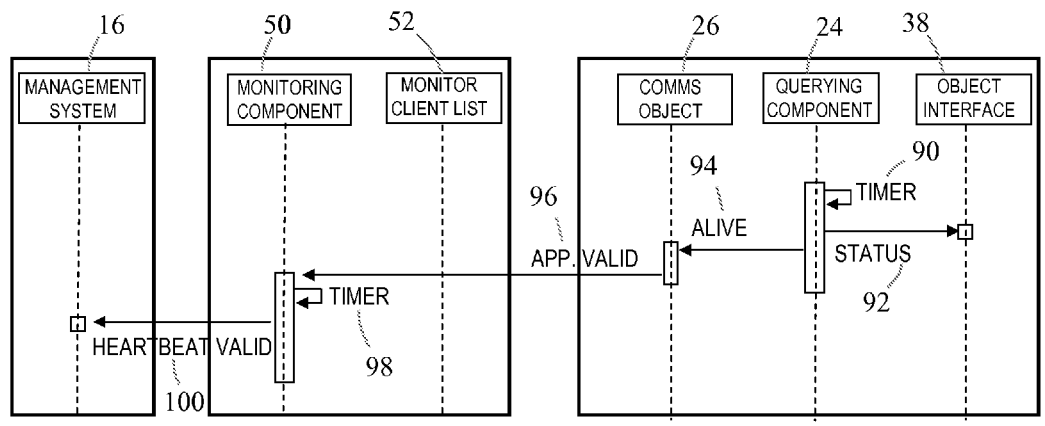
FIG. 3 is a simplified sequence diagram following on from the sequence diagram of FIG. 2 and illustrating messages and events associated with the software components of FIG. 1 as they co-operate to provide a heartbeat valid signal to a management system.

Reference will now be made to FIG. 3, which is a sequence diagram following on from the sequence diagram of FIG. 2 and illustrating messages and events associated with the application suite 12 and the monitoring suite 14 co-operating to provide a heartbeat valid signal to a management system 16.

The querying component 24 uses its timer routine 40 to measure the polling interval (event 90). The querying component 24 ensures that during this polling interval it sends a status request message to all objects 32,34,36 having the IActivityMonitor interface 38 (event 92).

When each object 32,34,36 having the IActivityMonitor interface 38 is instantiated, it registers with a registration list object (not shown). Once all of the objects 32,24,36 are instantiated, this registration list object (not shown) contains a list of all objects that are to receive status request messages from the querying component 24. Once the querying component 24 is instantiated, it gets a list of the registered objects (objects 32,34,36 in this embodiment) from the registration list object (not shown). This enables the querying component 24 to know which objects have the IActivityMonitor interface 38.

The status request message comprises a method (the "IsActive" method) that must be processed by the object 32,34,36 within the response time (one second in this embodiment).

In the example of FIG. 3, all of the objects respond with an active bit (indicating that none of the objects is in a halt state). This response generates an "Alive" event (event 94) at the querying component 24, which is used by the communication object 26 to generate and transmit an application valid signal (event 96) to the monitoring component 50.

The monitoring component 50 uses its timer routine 54 to measure the heartbeat interval (event 98). The monitoring component 50 uses the timer routine 54 to ensure that a heartbeat signal is transmitted to the management system 16 (specifically the heartbeat monitor 60) in a timely manner, that is, once during each heartbeat interval (one hundred and twenty seconds in this embodiment).

In this example, an application valid signal was received from the communication object 26, so the monitoring component 50 creates and transmits a heartbeat valid signal (event 100) to the management system 16.

The monitoring component 50 also writes a heartbeat event to the event log 62, indicating that a heartbeat valid signal was generated. As is known to those of skill in the art, the event log 62 is used as an aid in identifying any causes of failure caused by the software entities because it contains a list of events triggered by instrumented code.

Figure 4:
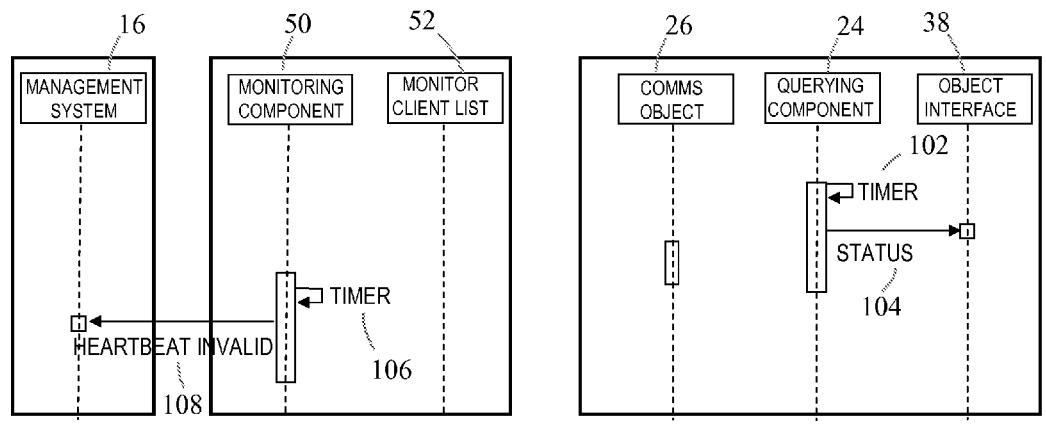
FIG. 4 is a simplified sequence diagram following on from the sequence diagram of FIG. 2 and illustrating messages and events associated with the software components of FIG. 1 as they co-operate to provide a heartbeat invalid signal to a management system.

Reference will now be made to FIG. 4, which is a sequence diagram following on from the sequence diagram of FIG. 2 and illustrating messages and events associated with the application suite 12 and the monitoring suite 14 co-operating to provide a heartbeat invalid signal to a management system 16.

In the same manner as for FIG. 3, the querying component 24 uses its timer routine 40 to measure the polling interval (event 102). The querying component 24 ensures that during this polling interval it sends a status request message to all objects 32,34,36 having the IActivityMonitor interface 38 (event 104).

The status request message comprises the IsActive method, which must be processed by the object 32,34,36 within the response time (one second in this embodiment).

In the example of FIG. 4, at least one of the objects 32,34,36 does not respond within the response time. The querying component 24 interprets this lack of response as meaning that one of the objects 32,34,36 is in a halt state. As a result, no "Alive" event is generated at the querying component 24, so an application valid signal is not sent from the communication object 26 to the monitoring component 50.

The monitoring component 50 uses its timer routine 54 to measure the heartbeat interval (event 106). After the heartbeat interval has elapsed, since an application valid signal was not received from the communication object 26 within the heartbeat interval, the monitoring component 50 creates and transmits a heartbeat invalid signal (event 108) to the heartbeat monitor 60.

The monitoring component 50 also writes a heartbeat ceased event to the event log 62, indicating that a heartbeat invalid signal was generated.

Figure 5:
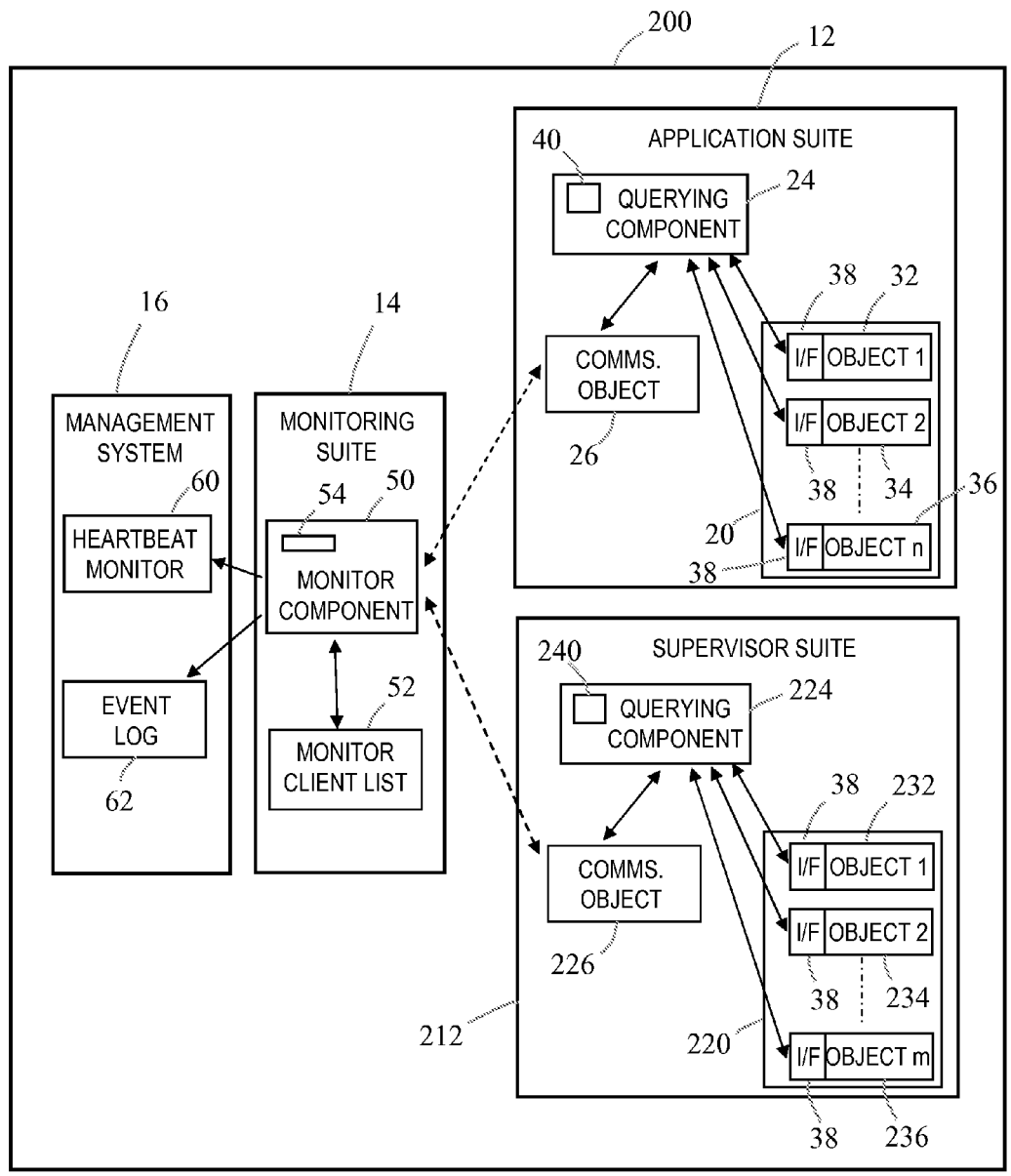
FIG. 5 is a simplified schematic diagram of an SST memory executing software components providing a heartbeat function according to another embodiment of the present invention.

Reference will now be made to FIG. 5, which is a simplified schematic diagram of an SST memory 200 executing software components providing a heartbeat function according to another embodiment of the present invention.

As shown in FIG. 5, the memory 200 executes various software entities, including the application suite 12, the monitoring suite 14, the management system 16 (all of the preceding software entities being identical to the corresponding entities of FIG. 1), and a supervisor application suite 212. All of these software entities execute within a .NET framework.

The supervisor application suite 212 includes supervisor control code 220 comprising a plurality of objects used for assisting a service person in conducting maintenance, settlement, upgrading, and diagnostic functions.

The supervisor application suite 212 also comprises a querying component 224 and a communication object 226 instantiated by the querying component 224. Querying component 224 and communication object 226 are very similar, and provide corresponding functions, to querying component 24 and communication object 26. However, querying component 224 may have a different response time and a different polling time, if desired. The querying component also includes a timer routine 240.

The supervisor control code 220 comprises a large number of objects (labeled "Object 1" to "Object m" in FIG. 5), although only three objects 232,234,236 are illustrated in FIG. 5. Each of these objects 232,234,236 includes an identical defined interface (the "IActivityMonitor" interface) 38 that supports a single method (the "IsActive" method). It should be appreciated that each of the objects 232,234,236 includes other interfaces to enable the objects 232,234,236 to perform their required functions, but these other interfaces are conventional, so will not be described in detail herein.

In a similar manner to the first embodiment (FIGS. 1 to 4), once the monitoring component 50 is instantiated and has created and registered an instance of the monitor client list object 52, both the application suite querying component 24 and the supervisor suite querying component 224 register with the monitoring component 50 and create communication objects 26,226 respectively.

The application suite querying component 24 and the supervisor suite querying component 224 operate independently of each other, sending status messages to their respective objects within their respective polling intervals.

Only if the monitoring component 50 receives a heartbeat valid signal from each of the application suite 12 and the supervisor suite 212 will the monitoring component 50 generate and transmit a heartbeat valid signal to the heartbeat monitor 60. If either the application suite 12 or the supervisor suite 212 does not provide an application valid signal, then the monitoring component 50 will generate and transmit a heartbeat invalid signal to the heartbeat monitor 60. the monitoring component 50 may also update the event log 62 with details of which application suite (12 or 212) did transmit an application valid signal, and which application suite (12 or 212) did not transmit an application valid signal.

It should now be appreciated that these embodiments have the advantage of providing a simple interface for objects that may enter a halt state, thereby avoiding having to code a heartbeat generation routine into every object. Each object can be individually coded as to how to respond to a status request most efficiently. A single monitoring suite is provided to record responses from different applications, and to provide a single signal from which a heartbeat can be generated.

Various modifications may be made to the above described embodiments within the scope of the invention, for example, in other embodiments, a different software architecture may be provided that does not use the Microsoft .NET framework.

In other embodiments, an object in a halt state may be able to respond to a status request with an inactive bit (indicating that at least one of the objects is in a halt state). In such embodiments, this response may generate a "NotAlive" event at the querying component, which may be used by the communication object to generate and transmit an application invalid signal to the monitoring component. Alternatively, the communication object may not generate any signal, and the absence of an application valid signal may be used by the monitoring component to generate and transmit a heartbeat invalid signal.

In other embodiments, instead of the absence of an application valid signal being used to trigger a heartbeat invalid signal, the communication object may generate and transmit a heartbeat invalid signal, which can be used to trigger a heartbeat invalid signal.

In other embodiments, a more complex defined interface 38 may be provided than described in the above embodiments. For example, the interface may allow for more details about the thread that was not executing, or any underlying problem causing the thread to halt.

In other embodiments, the value of the time (the response time) and intervals (polling interval, reporting interval, and heartbeat interval) may be different to those provided above.

In other embodiments, the polling interval may be triggered by an event rather than the elapse of time.

In other embodiments, the heartbeat system may be used on a computing device other than a self-service terminal.

In other embodiments, the heartbeat system may be used on a self-service terminal other than an ATM.

In other embodiments, the querying component 24 may be programmed with a list of objects that support the defined interface 38.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of generating a heartbeat signal for an application comprising a first timer routine and one or more objects that may enter a halt state, the method comprising steps of:
   (a) based upon a period associated with the first timer routine, periodically sending a status request to a defined interface on each object;
   (b) monitoring any responses to the status requests to ascertain if each object is operating normally or in a halt state;
   (c) generating an application valid signal in the event that each object is operating normally;
   (d) transmitting the application valid signal, if generated, to a monitoring component which comprises a second timer routine different from the first timer routine and which monitoring component is independent of the application; and
   (e) based upon a period associated with the second timer routine, periodically generating at the monitoring component a heartbeat valid signal in response to receipt of the application valid signal.

2. A method according to claim 1, wherein step (a) is implemented using a component within the application.

3. A method according to claim 1, wherein step (a) is implemented using a component external to the application.

4. A method according to claim 1, wherein step (b) includes either (i) receiving a response from each object, or (ii) not receiving a response from every object within a response time.

5. A method according to claim 1, further comprising the step of (c+1) generating an application invalid signal in the event that at least one object is in a halt state.

6. A method according to claim 5, further comprising the step of (d+1) transmitting the application invalid signal, if generated, to the monitoring component.

7. A method according to claim 6, further comprising the step of (f) generating at the monitoring component a heartbeat invalid signal in the event that either (i) the application valid signal is not received within a reporting interval, or (ii) an application invalid signal is received.

8. A method according to claim 1, wherein the method is repeated after a heartbeat interval which is based upon a period associated with the second timer routine has elapsed.

9. A method according to claim 1, wherein steps (a) and (b) are performed every polling interval which is based upon a period associated with the first timer routine.

10. A method according to claim 9, wherein step (d) is repeated once in every reporting interval which is based upon a period associated with the first timer routine.

11. A method according to claim 10, wherein step (e) is implemented once in every heartbeat interval which is based upon a period associated with the second timer routine.

12. A self-service terminal including a computer program executable by a processor of the self-service terminal, and arranged to implement the steps of claim 1.

13. A heartbeat system comprising:
   (i) a number of applications in which each application comprises
      (a) at least one object that may enter a halt state, each object including a defined interface identical for all objects and for receiving status requests;
      (b) a first timer routine; and
      (c) a querying component arranged to ascertain if each object is operating normally or in a halt state by periodically sending a status request to the defined interface of each object based upon the first timer routine, and being further arranged to transmit an application valid signal based upon the first timer routine when all objects are operating normally;
   (ii) a monitoring component in communication with the querying component and operable to receive the application valid signal therefrom, the monitoring component comprising a second timer routine which is different from the first timer routine and being arranged to generate
      (a) a heartbeat valid signal which is based upon the second timer routine in the event that the application valid signal is received within a reporting interval which is based upon the first timer routine, or
      (b) a heartbeat invalid signal which is based upon the second timer routine in the event that the application valid signal is not received within the reporting interval which is based upon the first timer routine; and
   (iii) a processor arranged to execute the number of applications and the monitoring component to provide a heartbeat mechanism in which either a heartbeat valid signal or a heartbeat invalid signal can be generated and transmitted to a heartbeat monitor of a management system.

14. A heartbeat system according to claim 13, wherein the number of applications comprises a plurality of applications, each of the plurality of applications including (a) at least one object that may enter a halt state, each object including a defined interface identical for all objects and for receiving status requests; and (b) a querying component.

15. A heartbeat system according to claim 13, wherein the monitoring component further comprises a process list object including a list of all processes that are registered with the monitoring component.

16. A method of generating a heartbeat signal for an application comprising one or more objects that may enter a halt state, the method comprising:
   sending a status request to a first defined interface of each object of a first group of objects of an application suite to ascertain if each object of the first group of objects of the application suite is operating normally or in a halt state;
   transmitting a first application valid signal from a first querying component of the application suite to a monitoring component of a monitoring suite when all objects of the first group of objects of the application suite are operating normally;
   sending a status request to a second defined interface of each object of a second group of objects of a supervisory suite which is different from the application suite to ascertain if each object of the second group of objects of the supervisory suite is operating normally or in a halt state;
   transmitting a second application valid signal from a second querying component of the supervisory suite to the monitoring component of the monitoring suite when all objects of the second group of objects of the supervisory suite are operating normally; and
   generating a heartbeat valid signal at the monitoring component of the monitoring suite in the event that the first application valid signal is received within a first reporting interval and the second application valid signal is received within a second reporting interval.

17. A method according to claim 16, further comprising generating at the monitoring component of the monitoring suite a heartbeat invalid signal in the event that the first application valid signal is not received within the first reporting interval and the second application valid signal is not received within the second reporting interval.

18. A method according to claim 17, further comprising transmitting a heartbeat valid signal from the monitoring component of the monitoring suite to a heartbeat monitor of a management system which is separate from the application suite, the supervisory suite, and the monitoring suite.

19. A method according to claim 16, wherein (i) the first defined interface of the application suite and the second defined interface of the supervisory suite are identical to each other, and (ii) the first and second reporting intervals are the same.

20. A method according to claim 16, wherein (i) the first querying component of the application suite and the second querying component of the supervisory suite operate independently of each other.

* * * * *